(12) United States Patent
Broughton

(10) Patent No.: US 6,257,088 B1
(45) Date of Patent: Jul. 10, 2001

(54) ATTACHMENT OF STEERING WHEEL TO STEERING SHAFT

(75) Inventor: Andrew D. Broughton, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/456,168

(22) Filed: Dec. 7, 1999

(51) Int. Cl.$^7$ ........................... B62D 1/10
(52) U.S. Cl. ........................... 74/552
(58) Field of Search ........................ 74/552; 280/728.2, 280/731; 403/299, 359.5

(56) References Cited

U.S. PATENT DOCUMENTS

| | | |
|---|---|---|
| 4,624,596 | 11/1986 | Eckendorff . |
| 4,662,775 | * 5/1987 | Faul ........................... 74/552 X |
| 4,819,961 | 4/1989 | Henigue . |
| 4,938,094 | 7/1990 | Cochard . |
| 5,002,422 | * 3/1991 | Schremmer et al. ............ 74/552 X |
| 5,816,112 | * 10/1998 | Hosoi et al. .................. 74/552 |
| 5,921,147 | * 7/1999 | Nagata et al. ................ 74/552 |

FOREIGN PATENT DOCUMENTS

| | | | |
|---|---|---|---|
| 3400609 | * 2/1985 | (DE) | ........................... 74/552 |
| 475183 | * 3/1992 | (EP) | ........................... 74/552 |
| 2592925 | * 7/1987 | (FR) | ........................... 74/552 |
| 2600134 | * 12/1987 | (FR) | ........................... 74/552 |
| 4-218466 | * 8/1992 | (JP) | ........................... 74/552 |

\* cited by examiner

*Primary Examiner*—Mary Ann Green
(74) *Attorney, Agent, or Firm*—Tarolli, Sundheim, Covell, Tummino & Szabo L.L.P.

(57) ABSTRACT

An apparatus (10) comprises a vehicle steering shaft (12) rotatable about an axis (24) and a rotatable steering wheel (14). A member (16) drivingly connects the steering wheel (14) and steering shaft (12) to rotate the steering shaft about the axis upon rotation of the steering wheel. The steering wheel (14) has a straight ahead angular position relative to the steering shaft (12). The apparatus (10) includes structure for enabling the steering wheel straight ahead angular position relative to the steering shaft (12) to be changed. The structure includes cooperating portions (32, 44) of the steering shaft (12) and the member (16) which enable a coarse angular adjustment of the member relative to the steering shaft and cooperating portions (62, 92) of the steering wheel (14) and the member which enable a fine angular adjustment of the steering wheel relative to the member. The fine angular adjustment is of an angle smaller than the coarse angular adjustment.

12 Claims, 2 Drawing Sheets

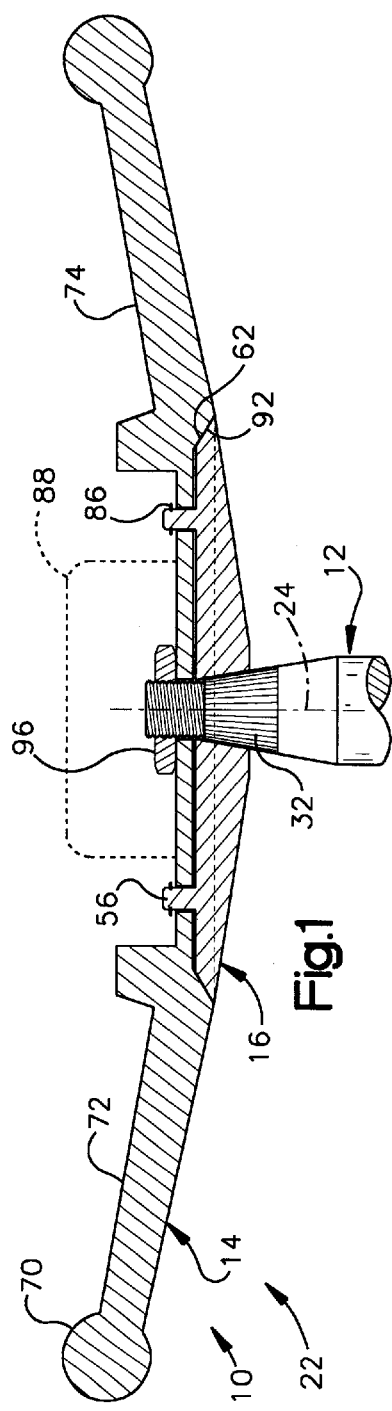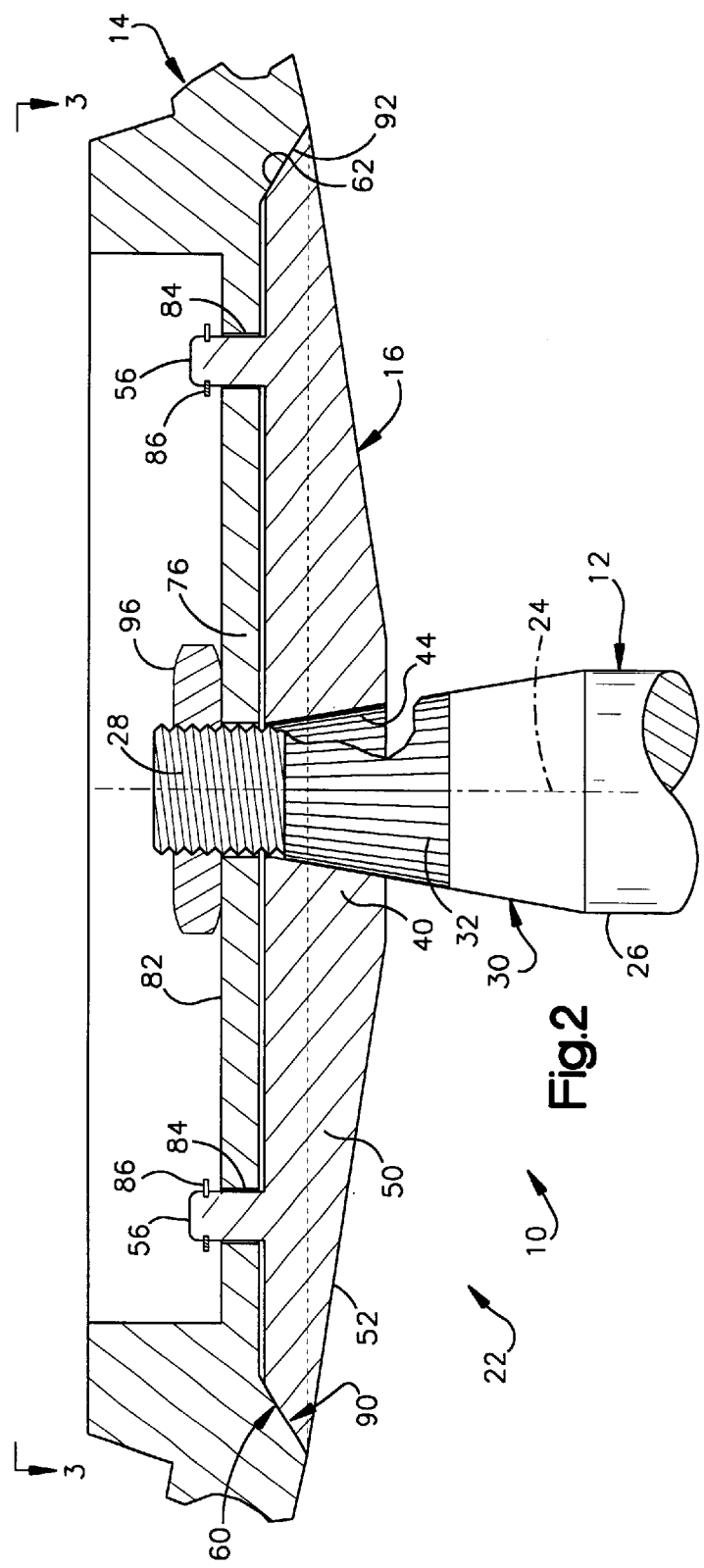

ATTACHMENT OF STEERING WHEEL TO STEERING SHAFT

BACKGROUND OF THE INVENTION

1. Technical Field

The present invention relates to the attachment of a vehicle steering wheel to the steering shaft of a vehicle. In particular, the present invention relates to the straight ahead angular adjustment of a vehicle steering wheel relative to the steering shaft of the vehicle.

2. Description of the Prior Art

Most vehicles are steered by manual rotation of a vehicle steering wheel. The steering wheel is fixed for rotation with a steering shaft about a steering axis. Rotation of the steering shaft effects steering movement of the steerable wheels of the vehicle.

It is desirable that the steering wheel have a particular orientation about the steering axis when the vehicle is travelling straight ahead. To enable proper orientation of the steering wheel, the steering wheel is mounted on the steering shaft with an adjustable splined connection. The industry standard splined connection for commercial vehicles is a connection with 36 splines, thus providing a ten degree pitch between splines. This pitch allows for angular adjustment of the steering wheel in ten degree increments. It is desirable to be able to adjust the steering wheel angular orientation in finer increments, so as to enable the desired straight ahead angular adjustment of the steering wheel.

SUMMARY OF THE INVENTION

The present invention is an apparatus comprising a vehicle steering shaft rotatable about an axis and a rotatable steering wheel. A member drivingly connects the steering wheel and steering shaft to rotate the steering shaft about the axis upon rotation of the steering wheel. The steering wheel has a straight ahead angular position relative to the steering shaft. The apparatus includes structure for enabling the steering wheel straight ahead angular position relative to the steering shaft to be changed. The structure includes cooperating portions of the steering shaft and the member which enable a coarse angular adjustment of the member relative to the steering shaft and cooperating portions of the steering wheel and the member which enable a fine angular adjustment of the steering wheel relative to the member. The fine angular adjustment is of an angle smaller than the coarse angular adjustment.

BRIEF DESCRIPTION TO THE DRAWINGS

The foregoing and other features of the present invention will become apparent to one skilled in the art to which the present invention relates upon consideration of the following description of the invention with reference to the accompanying drawings, wherein:

FIG. 1 is a side sectional view of an apparatus in accordance with the present invention;

FIG. 2 is an enlarged view of a portion of the apparatus of FIG. 1;

DETAILED DESCRIPTION OF AN EMBODIMENT OF THE INVENTION

Figure 3:
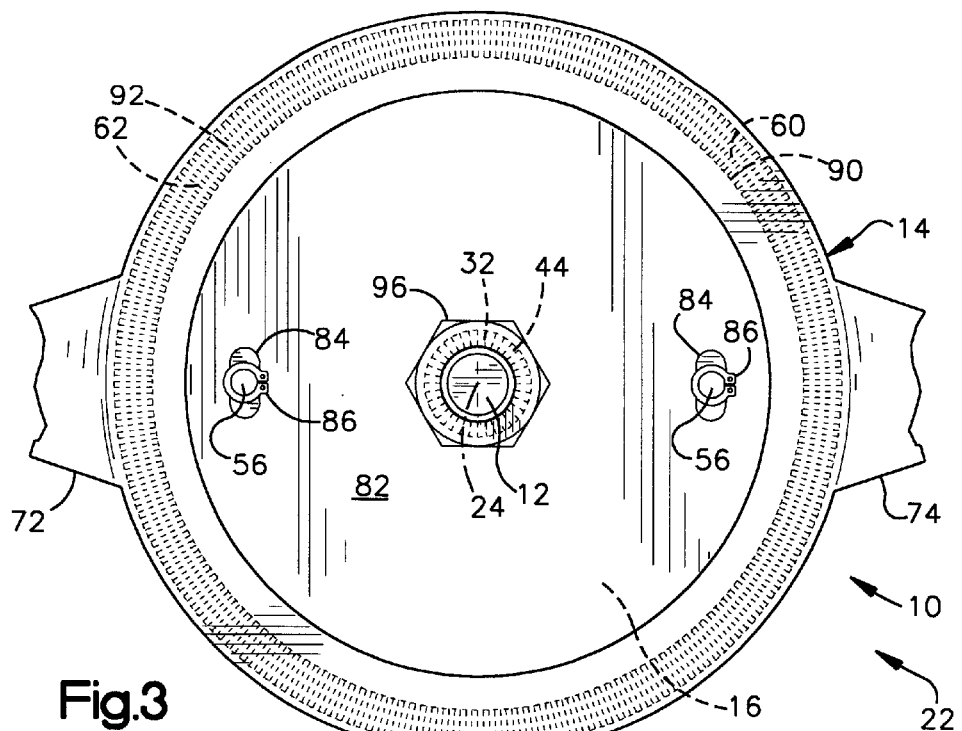
FIG. 3 is a top plan view of the apparatus portion shown in FIG. 2.

The present invention relates to the attachment of a vehicle steering wheel to the steering shaft of a vehicle. As representative of the present invention, FIG. 1 illustrates an apparatus 10 including a vehicle steering shaft 12, a steering wheel 14, and an intermediate member 16.

The steering shaft 12 is a part of a steering column 20 of a vehicle 22. The shaft 12 is fixed axially in the vehicle 22 but is supported for rotation about an axis 24. The shaft 12 has a cylindrical body portion 26 centered on the axis 24. The body portion 26 is connected in a manner not shown with the steerable wheels of the vehicle 22, so that rotation of the shaft 12 about the axis 24 effects steering movement of the vehicle. The shaft 12 has an externally threaded end portion 28.

A frustoconical portion 30 of the steering shaft 12 extends between the body portion 26 and the end portion 28. The frustoconical portion 30 of the steering shaft 12 has a series of external serrations or splines 32.

Figure 4:
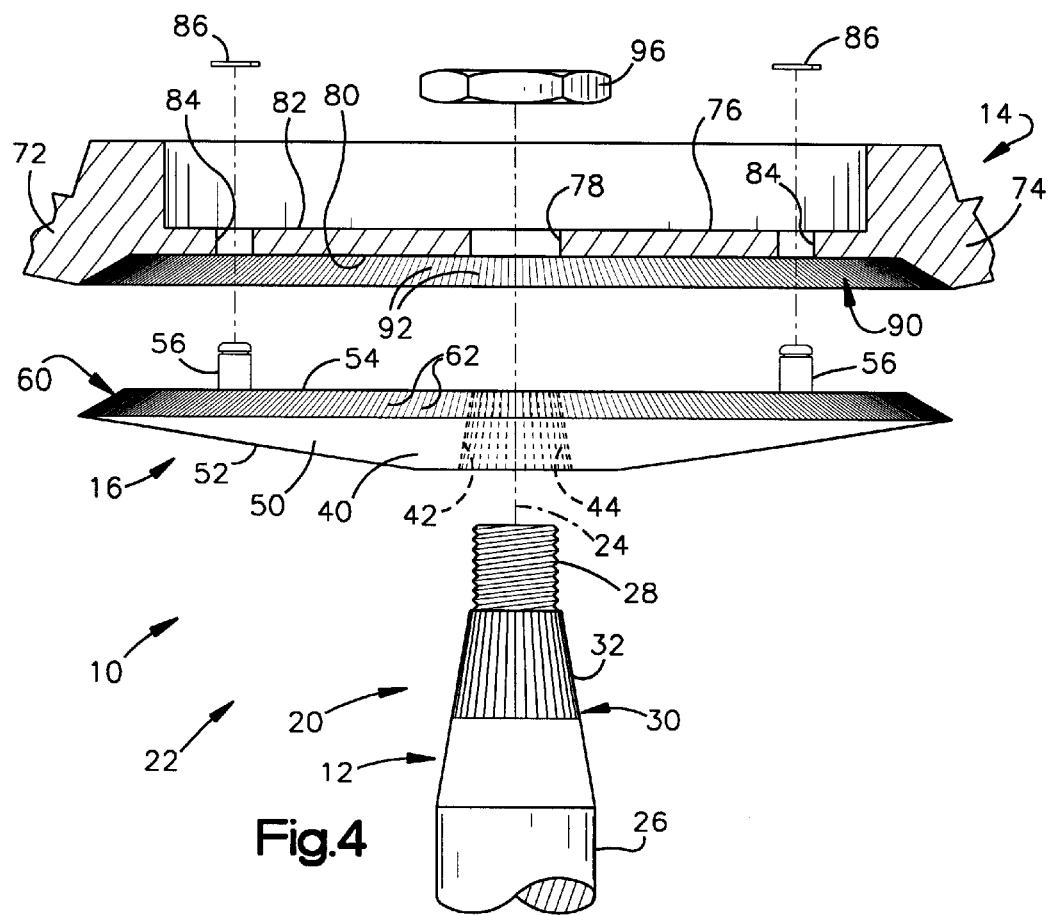
FIG. 4 is an exploded sectional view of the apparatus portion shown in FIG. 2.

The intermediate member 16 (FIG. 4) has a hub portion 40 with a tapered central opening 42. The central opening 42 in the hub portion 40 of the intermediate member 16 is tapered at the same angle as the frustoconical portion 30 of the steering shaft 12.

The central opening 42 in the intermediate member 16 has a series of internal serrations or splines 44 that are equal in number to the external splines 32 on the steering shaft 12. The intermediate member 16 is press fit on the steering shaft 12. The serrations 44 on the intermediate member 16 engage the serrations 32 on the steering shaft 12 to block relative rotation between the steering shaft and the intermediate member.

In the illustrated embodiment, the steering shaft 12 and the hub portion 40 of the intermediate member 16 each have 36 serrations, spaced equally about the axis 24. Thus, the serrations 32 and 44 have a pitch of ten degrees. This spacing enables the intermediate member 16 to be positioned on the steering shaft 12 at any one of thirty-six ten-degree angular intervals about the axis 24.

A disc portion 50 of the intermediate member 16 extends radially outward from the hub portion 40 to support the steering wheel 14. The disc portion 50 has an inner side surface 52 that is presented toward the body portion 26 of the steering shaft 12 and an outer side surface 54 that is presented toward the vehicle driver. Two pins 56 located diametrically opposite each other project from the outer side surface 54 of the intermediate member 16.

A serrated frustoconical surface 60 on the outer periphery of the intermediate member 16 extends between the outer periphery of the inner side surface 52 and the outer periphery of the outer side surface 54. The frustoconical surface 60 on the intermediate member 16 is presented toward the steering wheel 14. Because the frustoconical surface 60 is located at the outer periphery of the intermediate member 16, its overall diameter is substantially greater than the diameter of the steering shaft 12.

The frustoconical surface 60 on the intermediate member 16 has a series of serrations 62 that are spaced equally about the axis 24. The number of the serrations 62 is substantially greater than the number of the serrations 32 on the steering shaft 12. In the illustrated embodiment, the serrated surface 60 has 360 serrations 62, with a pitch of one degree.

The steering wheel 14 (FIG. 1) has an annular rim 70 engageable by the driver of the vehicle 22 to effect steering movement of the vehicle. Two spokes 72 and 74 extend radially inward from the rim 70 to a disc-shaped central portion 76 of the steering wheel 14. The central portion 76 of the steering wheel 14 has a through hole 78 for receiving the end portion 28 of the steering shaft 12.

The central portion 76 of the steering wheel 14 has a planar inner side surface 80 that is presented toward the steering shaft 12 and the intermediate member 16, and a planar outer side surface 82 that is presented toward the vehicle driver. Two slots 84 located diametrically opposite each other in the central portion 76 of the steering wheel 14 receive the pins 56 on the intermediate member 16. Snap rings 86 or other suitable fasteners are located on the ends of the pins 56. The central portion 76 of the steering wheel 14 also supports a driver's side air bag module indicated schematically at 88 (FIG. 1).

A serrated frustoconical surface 90 on the outer periphery of the central portion 76 of the steering wheel 14 extends radially outwardly from the inner side surface 80 and axially in a direction toward the steering shaft 12. The serrated surface 90 is presented toward the steering shaft 12.

The serrated surface 90 on the steering wheel 14 is a mirror image of the serrated surface 60 on the intermediate member 16. The inner diameter of the serrated surface 90 on the steering wheel 14 is the same as the inner diameter of the serrated surface 60 on the intermediate member 16. The outer diameter of the serrated surface 90 on the steering wheel 14 is the same as the outer diameter of the serrated surface 60 on the intermediate member 16.

The serrated surface 90 on the steering wheel 14 has a series of serrations 92 that are spaced equally about the axis 24. The number of the serrations 92 on the steering wheel 14 is equal to the number of serrations 62 on the intermediate member 16, that is, 360 serrations with a pitch of one degree. As a result, the serrated surface 90 on the steering wheel 14 is engageable with the serrated surface 60 on the intermediate member 16 to block relative rotation between the steering wheel and the intermediate member.

A center nut 96 is screwed on the threaded end portion 28 of the steering shaft 12. The center nut 96 is tightened down on the outer side surface 82 of the central portion 76 of the steering wheel 14. The clamping force exerted by the center nut 96 presses the serrations 92 on the steering wheel 14 into engagement with the serrations 62 on the intermediate member 16. As a result, the steering wheel 14 is fixed for rotation with the intermediate member 16. The clamping force of the center nut 96 also presses the serrations 44 on the intermediate member 16 into engagement with the serrations 32 on the steering shaft 12. As a result, the intermediate member 16 is fixed for rotation with the steering shaft 12. The intermediate member 16 transmits rotational force from the steering wheel 14 to the steering shaft 12 to effect steering movement of the vehicle 22.

It is desirable that the two spokes 72 and 74 on the steering wheel 14 extend directly left and right in the vehicle 22 when the vehicle is travelling straight ahead. To provide this straight ahead angular position of the steering wheel 14, both coarse and fine adjustments are provided. A coarse angular adjustment of the intermediate member 16 relative to the steering shaft 12 is provided by the serrations 32 on the steering shaft 12 and the serrations 44 on the intermediate member 16. Specifically, the intermediate member 16 can be positioned on the steering shaft 12 at any one of thirty-six ten-degree angular intervals about the axis 24.

A fine angular adjustment of the steering wheel 14 relative to the steering shaft 12 is provided by the serrations 92 on the steering wheel and the serrations 62 on the intermediate member 16. Specifically, the steering wheel 14 can be positioned on the intermediate member 16 at any one of 360 one-degree angular intervals about the axis 24. As a result, the straight ahead angular orientation of the steering wheel 14 can be set very precisely, without loosening the connection between the intermediate member 16 and the steering shaft 12.

Should the center nut 96 inadvertently loosen, the steering wheel 14 may tend to lift axially off the intermediate member 16. If this occurs, the serrations 92 on the steering wheel 14 could disengage from the serrations 62 on the intermediate member 16, and the steering wheel could become free to rotate relative to the intermediate member, resulting in loss of steering ability. This loss of steering ability is prevented by the engagement of the pins 56 on the intermediate member 16 in the slots 84 on the steering wheel 14. The slots 84 have an angular extent sufficient to enable steering movement of the vehicle 22 while still informing the driver that the steering needs to be fixed. The snap rings 86 prevent the steering wheel 14 from lifting completely off the intermediate member 16. The snap rings 86 also allow enough axial movement of the steering wheel 14 to disengage the two sets of serrations 92 from the serrations 62 during adjustment of the steering wheel angular position.

The number of inter-engaging serrations on the intermediate member 16 and the steering wheel 14 can be determined based on manufacturing tolerances, diameter of available space on the steering wheel, cost factors, and fineness of orientation adjustment desired. The serrations 92 and 62 are preferably located radially outward as far as possible to obtain the maximum available space. This radially outward location of the serrations 92 and 62 also frees up the center of the steering wheel 14 for the air bag module 88 or other item to be mounted on the steering wheel.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:

a vehicle steering shaft rotatable about an axis;

a rotatable steering wheel;

a member drivingly connecting said steering wheel and said steering shaft to rotate said steering shaft about said axis upon rotation of said steering wheel;

said steering wheel having a straight ahead angular position relative to said steering shaft; and, structure for enabling said steering wheel straight ahead angular position relative to said steering shaft to be changed;

said structure including cooperating portions of said steering shaft and said member which enable a coarse angular adjustment of said member relative to said steering shaft and cooperating portions of said steering wheel and said member which enable a fine angular adjustment of said steering wheel relative to said member, said fine angular adjustment being of an angle smaller than said coarse angular adjustment, said cooperating portions of said steering wheel and said member being located radially outwardly of an air bag module by a distance great enough to enable mounting of said air bag module at the center of said steering wheel.

2. An apparatus as set forth in claim 1 wherein said cooperating portions which enable a coarse angular adjustment of said member relative to said steering shaft comprise interengaging first serrations on said member and said steering shaft having a first pitch, and said cooperating portions which enable a fine angular adjustment of said steering wheel relative to said member comprise interengaging second serrations on said steering wheel and said member having a second pitch less than said first pitch.

3. An apparatus as set forth in claim 2 wherein said interengaging first serrations on said member and said steering shaft are arranged in a circular array having a first diameter and said interengaging second serrations on said steering wheel and said member are arranged in a circular array having a second diameter greater than said first diameter.

4. An apparatus as set forth in claim 1 wherein said cooperating portions of said steering shaft and said member are arranged in a circular array having a first diameter and said cooperating portions on said steering wheel and said member are arranged in a circular array having a second diameter greater than said first diameter.

5. An apparatus as set forth in claim 1 wherein said cooperating portions of said steering wheel and said member are disengageable for adjustment without disengaging said cooperating portions of said steering shaft and said member.

6. An apparatus as set forth in claim 1 wherein said cooperating portions of said steering wheel and said member comprise abutting frustoconical surfaces each having a plurality of serrations that are engageable to block rotation of said steering wheel relative to said member.

7. An apparatus as set forth in claim 1 further comprising means for blocking axial movement of said steering wheel relative to said member beyond a distance needed to disengage and adjust said cooperating portions of said steering wheel and said member.

8. An apparatus comprising:

a vehicle steering shaft rotatable about an axis, said steering shaft having a first plurality of serrations spaced around said axis of said steering shaft;

a rotatable steering wheel having a second plurality of serrations spaced around said axis of said steering shaft;

a member for rotating said steering shaft about said axis upon rotation of said steering wheel, said member having a third plurality of serrations in mesh with said first plurality of serrations on said steering shaft and a fourth plurality of serrations in mesh with said second plurality of serrations on said steering wheel, said first and third plurality of serrations having the same pitch as each other and said second and fourth plurality of serrations having the same pitch as each other, the pitch of said first and third serrations being different than the pitch of said second and fourth serrations; and a first means for blocking axial movement of said steering wheel relative to said member; and a second means for blocking axial movement of said steering shaft relative to said member, said second blocking means being separate from said first blocking means.

9. An apparatus as set forth in claim 8 wherein said second and fourth serrations are formed on abutting frustoconical surfaces that are engageable to block rotation of said steering wheel relative to said member.

10. An apparatus as set forth in claim 8 wherein said first and third serrations are arranged in a circular array having a first diameter and said second and fourth serrations are arranged in a circular array having a second diameter greater than said first diameter.

11. An apparatus as set forth in claim 8 wherein said second and fourth serrations are disengageable from each other for adjustment without disengaging said first and third serrations from each other.

12. An apparatus comprising:

a vehicle steering shaft rotatable about an axis;

a rotatable steering wheel;

a member drivingly connecting said steering wheel and said steering shaft to rotate said steering shaft about said axis upon rotation of said steering wheel;

said steering wheel having a straight ahead angular position relative to said steering shaft; and, structure for enabling said steering wheel straight ahead angular position relative to said steering shaft to be changed;

said structure including cooperating portions of said steering shaft and said member which enable a coarse angular adjustment of said member relative to said steering shaft and cooperating portions of said steering wheel and said member which enable a fine angular adjustment of said steering wheel relative to said member, said fine angular adjustment being of an angle smaller than said coarse angular adjustment, said cooperating portions of said steering shaft and said member including frustoconical surfaces that are engageable to block rotation of said steering wheel relative to said member.

\* \* \* \* \*